Figure 1:
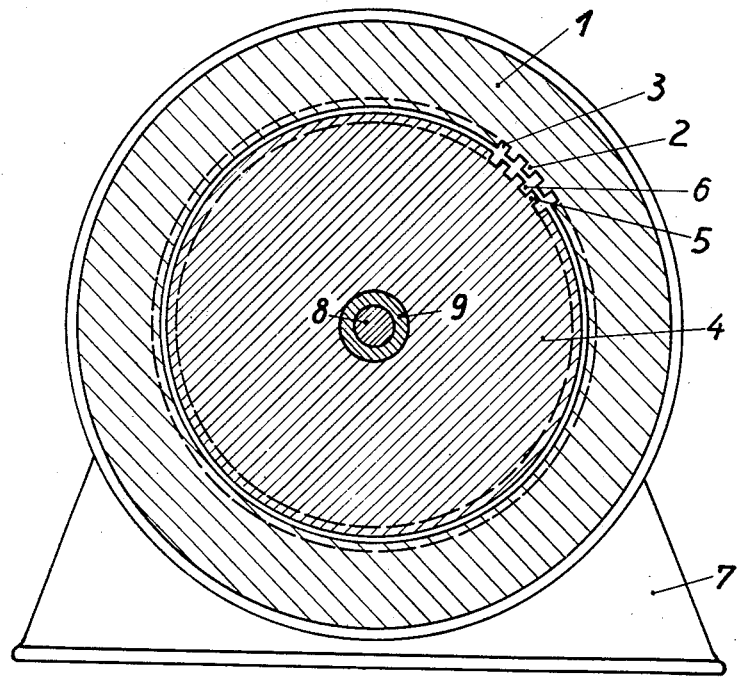

Dec. 16, 1941.   J. MASSOLLE   2,266,057
ELECTROSTATIC CONVERTER
Filed May 24, 1938   3 Sheets-Sheet 1

Inventor:
Joseph MASSOLLE
by
his Attorney

Dec. 16, 1941.  J. MASSOLLE  2,266,057
ELECTROSTATIC CONVERTER
Filed May 24, 1938  3 Sheets-Sheet 2
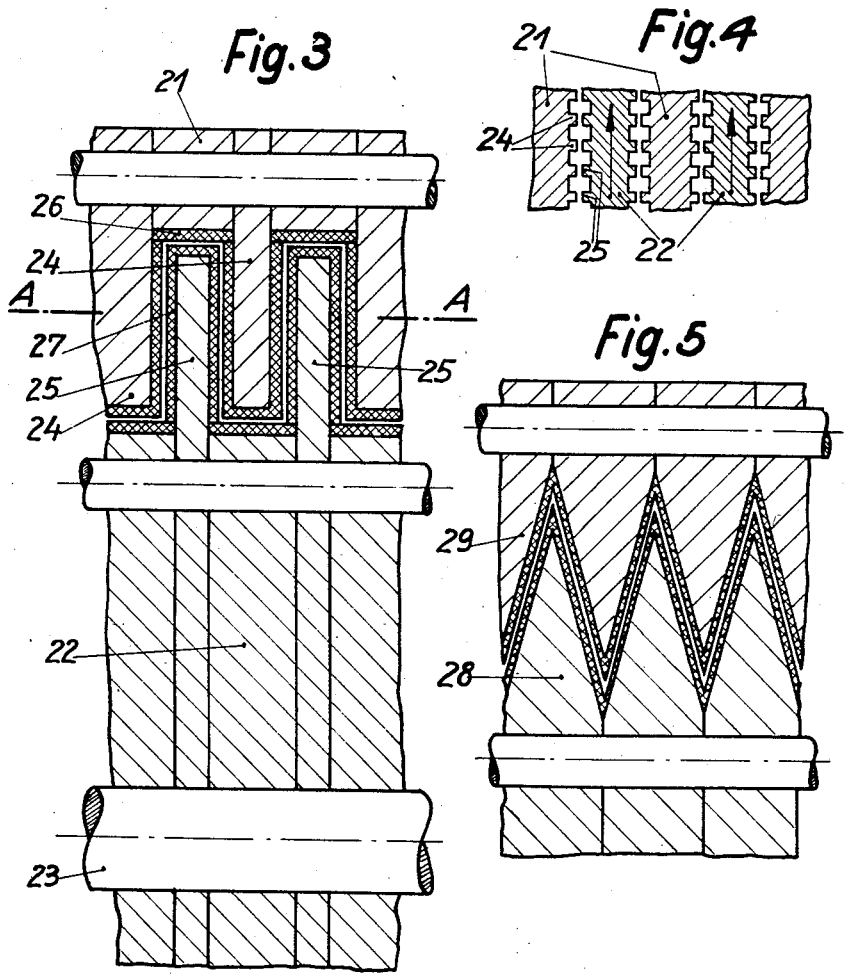
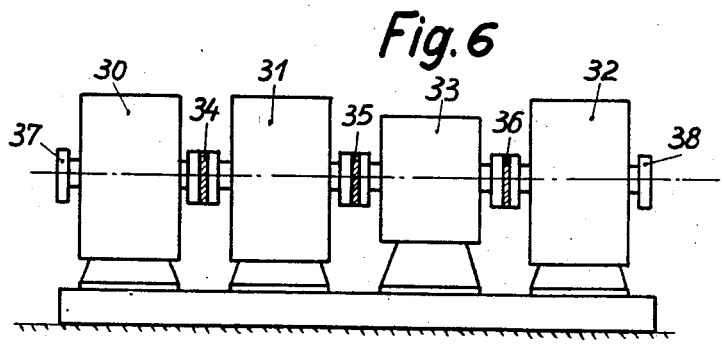
Inventor:
Joseph MASSOLLE
by K. M. Feist
his Attorney.

Dec. 16, 1941.   J. MASSOLLE   2,266,057
ELECTROSTATIC CONVERTER
Filed May 24, 1938   3 Sheets-Sheet 3
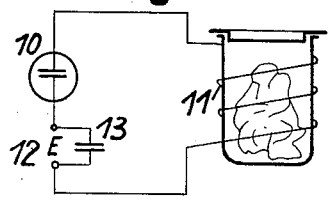
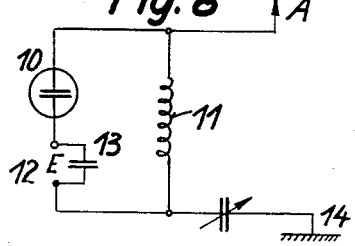
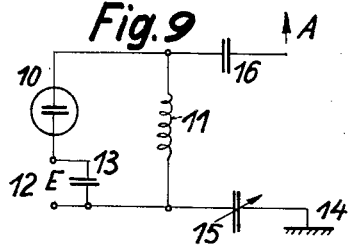
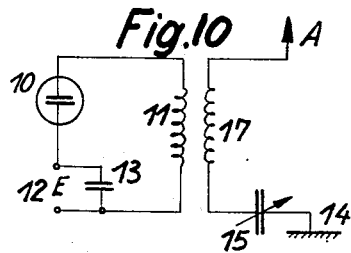
Inventor:
Joseph MASSOLLE Patented Dec. 16, 1941

2,266,057

UNITED STATES PATENT OFFICE 2,266,057

ELECTROSTATIC CONVERTER

Joseph Massolle, Gross-Glienicke, Post Cladow, Germany

Application May 24, 1938, Serial No. 209,760
In Germany February 13, 1933

7 Claims. (Cl. 175—363)

My invention relates to an electrical apparatus, and more particularly to an electrostatic converter for the production of an alternating voltage from an auxiliary direct voltage.

It is an object of my invention to provide an electrostatic converter of above described type with certain improvements, by means of which a high output of the converter may be obtained.

It is known in the art to provide the rotor of an electrostatic converter with spaced capacity surfaces, which are moved along one or several successive capacity surfaces by means of a rotation of the rotor. These capacity surfaces are connected to a source of direct current and to an oscillatory circuit and produce alternating current impulses of various shapes in said oscillatory circuit. The capacity value depends on the size of the surfaces being moved with respect to each other and on the dielectric arranged between the capacity surfaces. The smaller the gap between the capacity surfaces of the rotor and the stationary capacity sufaces, the higher the capacity value.

From the theoretical point of view, an increase in capacity could be obtained, if the capacity surfaces could be moved along each other as closely as possible. The dielectric strength of the dielectric, however, limits this theoretical increase in capacity. As is well known, said dielectric strength decreases in accordance with the reduction of the gap between the capacity surfaces, so that the direct voltage to be applied to the capacity surfaces should be reduced to the same extent as the air gap is reduced. If, however, the direct voltage is reduced, the alternating current output of the machine is decreased, although an increase in capacity is obtained. Thus, it is impossible to provide such an electrostatic converter with an air gap, which is almost reduced to the limit of mechanical safety. The output of the hitherto known machines requires the adjustment of the air gap to a size far exceeding the limit of mechanical safety, as the air gap must be adjusted according to the electrical safety.

Furthermore, it has been found in practice, that the adjustment of the air gap according to the dielectric strength of the gaseous dielectric in the gap is also insufficient, as dust particles may penetrate into the gap between the capacity surfaces during the operation of the electrostatic converter of above described type. If such dust particles penetrate into the gap and settle on the bare stationary capacity surfaces as well as, under certain circumstances, on the bare moving capacity surfaces, the discharge conditions between the capacity surfaces are subject to an extremely disadvantageous influence by the point effect and conductivity of the surface of dust particles. The dielectric strength of the air gap is decreased according to this change of the discharge conditions.

In my copending patent application Serial #205,885, filed May 4, 1938, I describe the arrangement of an insulating layer of substantial height on the capacity surfaces of the rotor and stator, whereby the above mentioned disadvantages may be overcome. This specific arrangement of an insulating layer has an advantageous influence on the discharge conditions between the capacity surfaces, but it has been found that the total capacity is reduced by the insertion of a solid body of substantial thickness between the effective capacity surfaces.

Assume, a solid dielectric substance of substantial thickness is arranged on the capacity surfaces of the rotor of the machine, then a charge cloud is formed on the surface facing the air gap, and a corresponding charge layer is formed in the surface of the solid dielectric.

Thus, two condensers arranged in series connection are produced instead of a single condenser formed by the capacity of the rotor and the stator. One of said two condensers consists of the capacity surfaces of the stator and the charge cloud, and the other one consists of the capacity surfaces of the rotor and the charge layer in the surface of the solid dielectric.

For example, if the dielectric constant of the air gap is equal to the dielectric constant of the solid dielectric, the capacity value is reduced to one half according to the laws of arrangement of capacities in series connections. Moreover, an increase of the dielectric constant of the solid insulating substance would result in a reduction of the total capacity value of the machine with respect to a usual machine having bare capacity surfaces. Although, accumulations of dust particles taken in consideration, such an arrangement would permit the reduction of the gap between the rotor and the stator to a size in accordance with the dielectric strength of the gaseous substance in the air gap, the capacity value of the machine would not be brought to a value permitting an increase of the output in combination with a selected higher voltage.

One object of my invention is to provide a machine, wherein the above mentioned highest capacity value may be obtained and at the same time an increase of the total output of the machine may be caused by an increase of the voltage applied to the capacity surfaces. According to my invention the accumulating capability of the output of the machine is increased with respect to capacity and voltage, so that an electrostatic converter is provided, the output of which does not require to be amplified and may be directly utilized for any commercial use, for example for the production of transmitting energy or for heat treatment by means of high frequency currents.

In order to carry out my invention into practice I provide an electrostatic converter, comprising a stator, a rotor rotatably mounted in said stator, said stator and said rotor being provided with capacity surfaces movable with respect to each other, said capacity surfaces being next to each other and forming a gap between them, gaseous dielectric substances arranged between said capacity surfaces, and a layer of solid substances of a dielectric constant and of a dielectric strength higher than air disposed between said capacity surfaces in addition to said gaseous dielectric substances, the height of the layer of said solid substances being less than the width of the gap between the stator and the rotor.

In my new machine of above described construction, the gap between the stator and rotor, which is filled with gaseous substances, may be easily reduced by the amount of higher dielectric strength of the solid substance to such an extent, that the width of the gap is determined only by the limit of mechanical safety. The gap must have only such a width, that a jamming of the rotor in the stator is prevented during the operation of the machine, even if the most disadvantageous differences in the expansion of the rotor and stator occur.

Although the new machine of above described construction also has two capacities arranged in series connection, said two capacities are of a value higher than that of the capacities of a usual machine, so that the total capacity value of the new machine may exceed to a great amount the total capacity value of a usual machine. Moreover, owing to the higher dielectric strength of the solid insulating substance, the electrical safety is again the same as or may be still higher than that of a usual machine, so that the total output of the machine according to my invention is increased.

According to a suitable embodiment of my new electrostatic converter the capacity surfaces on the rotor and/or on the stator are provided with a thin coat of insulating substances of a dielectric strength higher than air. The application of a thin coat of insulating substances to the capacity surfaces increases the capacity effect of this portion of the total capacity; furthermore, the thin coat permits an arrangement of the capacity surfaces nearer to each other than the possible nearest arrangement of the capacity surfaces in a machine, wherein a comparatively thick layer of an insulating substance selected in consideration of the required mechanical strength is mechanically attached to the capacity surfaces. Moreover, the higher dielectric strength of the coat of insulating substances permits a still closer arrangement of the capacity surfaces, as the air gap may also be reduced by the amount of the increased dielectric strength of the total distance; thus, the capacity effect of the condenser with a gaseous dielectric is also increased by arranging the charged surface of the coat still closer to the moving capacity surfaces. The high output of the machine is obtained by the arrangement in series connection of the increased capacities with gaseous and solid dielectrics, the dielectric strength of the total capacity being maintained or being increased, if desired.

In a preferred embodiment of my invention the coat is formed of dried solutions of cellulose applied to the surfaces in liquid state. If desired, cellulose-derivatives may also be used for the production of the coats. The coats may be manufactured by dipping, spraying or brushing operations. The formation of a thin film on the capacity surfaces having a higher dielectric constant and a higher dielectric strength in dried state results in a maximum output. An increase of the capacity effect of the second condenser formed by the gap may cause a further improvement of the output, which is already increased by the arrangement of the above described first condenser with the solid dielectric of favorable characteristics. In order to increase the capacity effect of the second condenser, the gap between the rotor and stator may be filled with gaseous substances of a dielectric constant higher than air and means may be provided for sealing the interior of the machine.

In order to increase the dielectric constant of the gaseous substances in the gap, the gaseous substances may be subject to a pressure higher than one atmosphere; according to a further embodiment of my invention the gap between the rotor and stator may be substantially evacuated.

Although it is known per se to evacuate the gap between the rotor and stator, the evacuation of the gap in combination with other features of my invention results in considerable advantages over the hitherto known machines. In the hitherto known machines, wherein a vacuum existing in the gap between the bare capacity surfaces causes the most favorable conditions for the formation of an electric gas discharge, the voltage applicable to the capacity surfaces depends on the ignition tension of the discharge path and, owing to accidentally possible ignitions by voltage impulses, on the glowing tension of said discharge path. In my new machine, however, such gas discharges cannot occur, as at least one of the electrodes is covered by the coat thus being rendered punctureproof.

Furthermore, the dielectric constant of the gaseous substance brought into the gap between the rotor and stator may be increased by the use of suitable special gases, such as sulphur dioxide or ammonia gas. If such gases are used, it is advisable to apply the coat to all surfaces of the rotor and stator in the interior of the machine, in order to avoid a destruction of the parts of the machine by said gases.

Figure 2:
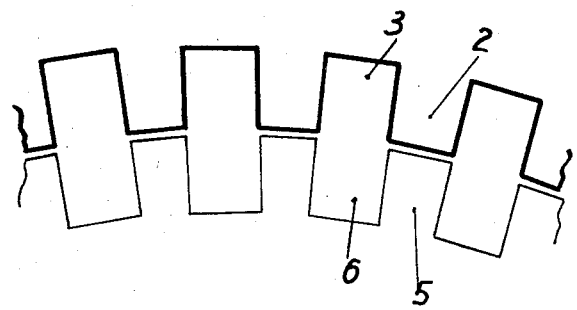

The invention will now be more particularly described with reference to the embodiments illustrated in the accompanying drawings which are given by way of example only. In the drawings:

Fig. 1 is a diagrammatic cross-sectional view of the stator and rotor of an electrostatic converter according to the invention, Fig. 2 is a fragmentary elevational view of the toothed surfaces of the stator and rotor, wherein the heavy solid lines indicate the arrangement of a protective coat on the surface of the stator, Fig. 3 is a fragmentary cross-sectional view of the stator and rotor of a further embodiment of the machine, said cross-sectional view being taken in the direction of the longitudinal axis of the machine, and the protective coats arranged on the capacity surfaces of the stator and rotor being exaggerated for the sake of better illustration, Fig. 4 is a fragmentary horizontal cross-sectional view of the stator and rotor in reduced scale, taken on line A—A of Fig. 3, the thin protective coats arranged on the capacity surfaces of the stator and rotor not being shown in this reduced scale, Fig. 5 is a fragmentary cross-sectional view of the stator and rotor similar to that shown in Fig. 3, in which, however, the stator and rotor are of a different shape, Fig. 6 is a diagrammatic side elevational view of an apparatus comprising a plurality of individual units, and Figs. 7–10 illustrate various circuit diagrams including the machine according to the invention.

Referring now to Fig. 1, 1 indicates the stator provided with the teeth 2 at its surface. The gaps 3 are formed between the individual teeth. 4 indicates the rotor provided with the teeth 5 at its surface. The gaps 6 are formed between the teeth 5 of the rotor. The stator 1 is mounted on a base 7, and the rotor 4 secured to insulating bushings 9 keyed to a shaft 8 is rotatably arranged in said stator. The shaft 8 may be journalled in bearings arranged on each side of the stator. The bearings are not shown in the drawings. The insulating bushings 9 serve to insulate the rotor and the stator from each other. If desired, however, the insulating bushings 9 could be omitted, and the insulating means could be arranged at other points of the machine, for example in the bearings or between the bearings and the bearing covers, so that the insulation is obtained between the stator and the bearing covers.

The opposed surfaces of the rotor and the stator form the poles or electrodes of the capacity, which is periodically varied in accordance with the movement of the teeth 5 of the rotor along the teeth 2 of the stator. The frequency of the alternations thus obtained is equal to the product obtained by multiplying the number of teeth by the number of rotations per second.

The form of oscillation depends on the shape of the teeth and may be varied in any desired manner by a variation of the shape of the teeth. Thus a single sine-shaped oscillation or an oscillation with certain harmonics to be utilized by a filtering process may be obtained by means of a suitable shape of the teeth. The production and utilization of harmonics is of especial importance in connection with wireless transmitters, as the frequency of the harmonics is a multiple of the frequency of the fundamental oscillation.

The output of the electrostatic converter varies in proportion to the capacity of the machine or to the periodic variation thereof.

In the embodiment of the electrostatic converter illustrated by Fig. 2, the coat or layer of solid substances of a dielectric constant and of a dielectric strength higher than air disposed in the gap between the capacity surfaces is applied to the surface of the stator only as indicated by the heavy line illustrating the circumference of the teeth 2 of the stator.

The calculation of the variation of the capacity of the machine is rather complicated owing to the field leakage in the gaps between the teeth, but the operation of the machine may be explained by means of the following data obtained in practice:

A maximum capacity of 2 centimetres with an alternating capacity of .6 centimetre may be obtained per tooth and per centimetre of the tooth length in a machine, wherein the tooth width is 1 millimetre, the tooth gap is 1.4 millimetres, the tooth gap depth is 2 millimetres and the total distance between opposed teeth is .3 millimetre, said total distance comprising an air space of .2 millimetre and a dielectric layer of .1 millimetre. The useful alternating voltage is about 30% of the direct voltage applied to such a machine.

A useful output of 8 watts at a frequency of 30,000 (equal to a wave length of 10,000 metres) is produced by a machine provided with teeth of above described dimensions and equipped with a rotor having a diameter of 137 millimetres and a length of 95 millimetres, when the direct voltage applied to the machine amounts to 600 volts.

A tenfold increase in the dimensions of the machine operating at the same speed of rotation results in an increase of one hundred times in the capacity or variation of the capacity and in an increase of ten times in the frequency, i. e. in a wave length of 1000 metres. Thus, the output of the machine shows already an increase of one thousand times, i. e. now, the output is 8 kilowatts. Machines of the embodiments shown in Figs. 3–6 to be described hereinafter have at least a ten times higher capacity, so that the output is 80 kilowatts. If the gap between the capacity surfaces is filled with sulphur dioxide or ammonia gas instead of with air, the output is increased about sixteen times. If the pressure of the gas is five times the pressure of the atmosphere, the output is increased four hundred times.

Fig. 3 illustrates an embodiment of an electrostatic converter having a considerably increased capacity. 21 generally indicates the stator composed of a plurality of rings and 22 generally indicates the rotor composed of a plurality of discs secured to the shaft 23. The stator and the rotor are provided with radially extending teeth 24 and 25 respectively, which are in the same alternate arrangement as the stationary rims of the guide blade discs and the rotary blade rims of a steam turbine.

Fig. 4 is a sectional view of the stator and rotor in reduced scale, taken on line A—A of Fig. 3. Fig. 4 illustrates the specific shape of the stator teeth 24 and the rotor teeth 25 for the periodic variation of their mutual capacity.

As best shown in Fig. 3, layers 26 and 27 respectively of solid dielectric substances are arranged on the effective surfaces of the stator and rotor respectively. These layers or coats are extremely thin, but they are exaggerated for the sake of better illustration. In the reduced scale of Fig. 4 the thin layers do not appear.

The rings of the stator and the discs of the rotor are provided with toothed annular portions at their lateral surfaces. These toothed annular portions are arranged one behind the other as seen in the direction of the longitudinal axis of the machine and are positioned in planes perpendicular to said longitudinal axis of the machine. The surfaces of opposed toothed annular portions of the stator and rotor form the effective and periodically varying capacity of the machine. A considerable increase of the effective capacity surfaces may be obtained by increasing the number of the toothed annular portions of the stator and rotor.

Fig. 5 shows a further embodiment of the electrostatic converter, wherein each disc-like member 28 of the rotor carrying the capacity surfaces is of triangular shape. The apex of each double-conical capacity disc of the rotor is on the periphery thereof. The embodiment of the rotor is of advantage with respect to the stresses caused by the centrifugal force, as the masses of the rotor discs are tapered toward the periphery, so that maximal peripheral speeds are permissible. The shape of the tooth discs 29 of the stator conforms to the shape of the tooth discs of the rotor.

Obviously, vacuum or increased gas pressure may also be used in the machine according to the embodiments shown in Figs. 3–5.

Generally speaking, it may be pointed out, that the use of high gas pressures has the additional advantage of causing the solid dielectric layers to be pressed firmly on the surfaces supporting them.

Fig. 6 illustrates further means for the increase of the output by coupling a plurality of individual electrostatic converters, operating in phase, with one or more driving motors. 30, 31 and 32 indicate three similar converters operating in phase, which are connected to a driving motor 33 by means of clutches 34, 35 and 36. If desired, additional converters may be operated through the medium of the clutches 37 and 38.

Figs. 7–10 illustrate various circuit diagrams including the machine according to the invention. In said circuit diagrams the load impedance is used as inductance. Preferably, this load impedance and the condenser formed by the machine are arranged in series in the direct current supply circuit of the machine. This inductance and the capacity of the machine are tuned to the frequency of the alternating current.

In Figs. 7–10, 10 indicates the electrostatic converter, 11 indicates the load impedance and 12 indicates the direct current supply source.

In order to obtain an effective resonance, the impedance value of the direct current supply source 12 must be small with respect to the alternating current circuit, so that the direct current supply source must be shunted by a condenser 13, if necessary. For example, this shunting of the direct current source by a condenser may become necessary, if a dynamo is used instead of a battery of accumulators.

In the circuits shown in Figs. 7 and 8 the tuning inductance is the same as the load. If desired, however, the tuning inductance and the load may also be connected otherwise, for example, by a capacitive or inductive coupling.

In the embodiment shown in Fig. 7 the load represents a high frequency furnace for the heating or melting of metallic substances. For this purpose, a crucible containing the substances is arranged in the field of the high frequency coil 11. The heat is produced in a manner known per se by means of eddy-currents generated in the substances by the high frequency field.

In the arrangements shown in Figs. 8–10 the machine 10 feeds a wireless transmitter provided with an aerial A and grounded at 14. The tuning of the aerial circuit may be effected by means of the condenser 15, which, however, may be arranged at other points of the circuit.

The capacitive coupling between the machine and the load is shown in Fig. 9. The aerial A is isolated from the direct current circuit by a condenser 16. If the inductive coupling between the machine and the load is used as shown in Fig. 10, the aerial A is isolated from the direct current circuit by the secondary coil 17.

I have described preferred embodiments of my invention, but it is clear that numerous changes and omissions may be made without departing from the spirit of my invention.

What I claim and desire to secure by Letters Patent is:

1. An electrostatic converter, comprising a stator, a rotor rotatably mounted in said stator, said stator and said rotor being provided with substantially radially extending teeth forming capacity surfaces movable with respect to each other, said tooth-like capacity surfaces being opposed each other and forming a gap between them, gaseous substances of a dielectric constant higher than air being placed in said gap, a homogeneous coat of insulating substances of a dielectric strength higher than air being applied to the capacity surfaces, and means for sealing the interior of the converter.

2. An electrostatic converter as claimed in claim 1, the gaseous substances in the gap between the stator and the rotor being under a pressure higher than one atmosphere.

3. An electrostatic converter as claimed in claim 1, the gap between the stator and rotor being evacuated.

4. An electrostatic converter as claimed in claim 1, the gap between the stator and the rotor being filled with sulphur dioxide, and the coat of insulating substances being applied to all surfaces of the stator and the rotor in the interior of the converter.

5. An electrostatic converter as claimed in claim 1, the gap between the stator and the rotor being filled with ammonia gas, and the coat of insulating substances being applied to all surfaces of the stator and the rotor in the interior of the converter.

6. An electrostatic converter, comprising a stator, a rotor rotatably mounted in said stator, said stator and said rotor being provided with substantially radially extending teeth forming capacity surfaces movable with respect to each other, said tooth-like capacity surfaces being opposed each other and forming a gap between them, gaseous dielectric substances arranged between said capacity surfaces, and solid substances of a dielectric constant and of a dielectric strength higher than air disposed between said capacity surfaces in addition to said gaseous dielectric substances, said solid substances being in the form of a thin homogeneous coat of dried solutions of cellulose applied to the capacity surfaces.

7. An electrostatic converter, comprising a stator, a rotor rotatably mounted in said stator, said stator and said rotor being provided with substantially radially extending teeth forming capacity surfaces movable with respect to each other, said tooth-like capacity surfaces being opposed each other and forming a gap between them, gaseous dielectric substances arranged between said capacity surfaces, and solid substances of a dielectric constant and of a dielectric strength higher than air disposed between said capacity surfaces in addition to said gaseous dielectric substances, said solid substances being in the form of a thin homogeneous coat of dried cellulose derivatives applied to the capacity surfaces.

JOSEPH MASSOLLE.